United States Patent [19]
Catlin

[11] 4,197,944
[45] Apr. 15, 1980

[54] PROBE COVER

[75] Inventor: David G. Catlin, Wanaque, N.J.

[73] Assignee: Becton, Dickinson and Company, Rutherford, N.J.

[21] Appl. No.: 943,322

[22] Filed: Sep. 18, 1978

[51] Int. Cl.² ............................................ B65D 85/20
[52] U.S. Cl. ................................. 206/306; 128/736; 220/461
[58] Field of Search .............. 206/306; 128/2 H, 2 M; 73/343 B, 343 R, 374; 220/461

[56] References Cited

U.S. PATENT DOCUMENTS

| | | | |
|---|---|---|---|
| 3,190,436 | 6/1965 | Diamant | 206/306 |
| 3,422,985 | 1/1969 | Rinehart | 220/461 X |
| 3,469,685 | 9/1969 | Baermann | 206/306 |
| 3,703,892 | 11/1972 | Meyers | 206/306 X |
| 3,809,228 | 5/1974 | Fowler et al. | 206/306 |
| 4,026,751 | 5/1977 | Fowler et al. | 206/306 |

*Primary Examiner*—Joseph M. Moy

[57] ABSTRACT

A disposable sheath for use with clinical measurement probes, such as a temperature probe. Two sheaths are provided, each with an open end, and which are attached to each other near their respective distal ends. The first sheath covers the probe, and the second sheath covers the first as measurements are taken. After withdrawal of the probe, the second sheath may be inverted to avoid contamination of the environment and other patients. Further pulling of the disposable cover removes it from the probe, which may then be used again without cleaning or sterilization.

21 Claims, 12 Drawing Figures

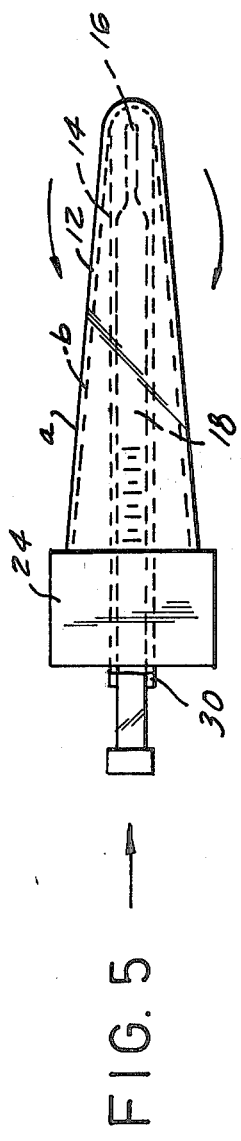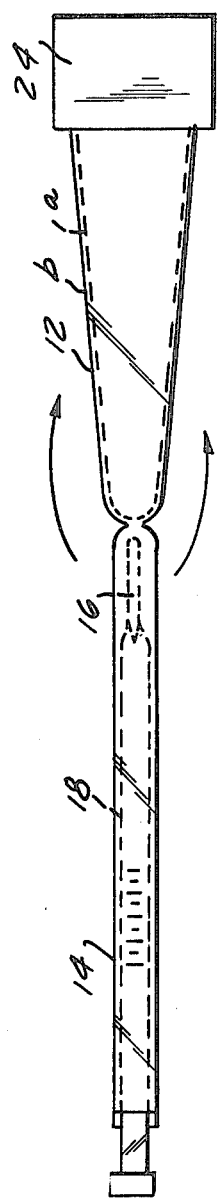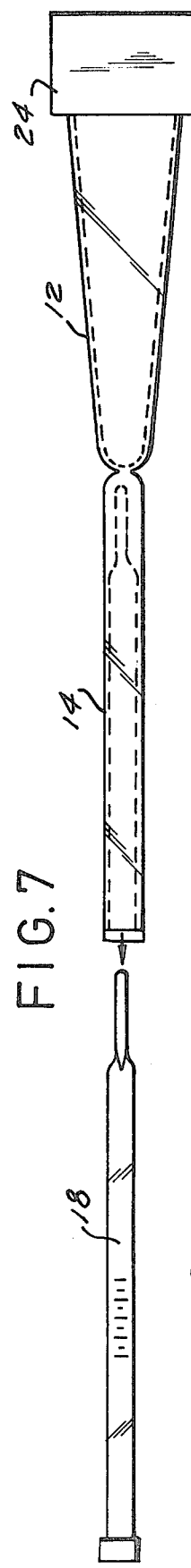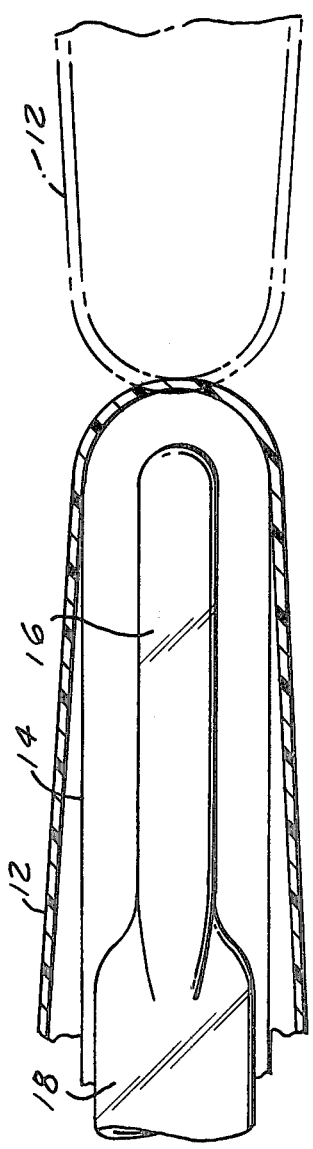
FIG. 5
FIG. 6
FIG. 7
FIG. 8

PROBE COVER

BACKGROUND OF THE INVENTION

This invention concerns disposable sheaths for use with clinical probes, such as those provided on thermometers. An invertible sheath is provided to effectively encapsulate bacteria present on the outer surface thereof.

Cleaning and sterilization of the thermometers is necessary to prevent cross-contamination of patients when a plurality of readings must be taken. This process can be both difficult and time-consuming, and it has been found to be advantageous to employ disposable sheaths to prevent cross-contamination of patients.

The sheaths which have heretofore been used are not completely effective in preventing contamination of the environment once the probe is withdrawn from the body. It is also difficult to remove such sheaths from the probe without contaminating the hands of the medical personnel. In addition, discarding the sheaths in conventional waste disposal devices leaves the contaminated surface of the sheath exposed.

Another problem which may be encountered is the puncture of the sheath while oral temperature readings are being taken. Since the probe is held by the teeth, a conventional flexible sheath may easily be cut or punctured thereby defeating the purpose of utilizing such a cover.

SUMMARY OF THE INVENTION

It is an object of the invention to provide a probe cover which will effectively prevent the contamination of the probe during use; and which will avoid contaminating the hospital environment upon its removal. This is accomplished by the utilization of inner and outer sheaths which are connected to each other at or near their distal ends. The outer sheath overlies the inner while the probe is in use, and its outer surface will be contaminated. After the probe is withdrawn, pulling the outer sheath will fold it back upon itself, and the contaminated surface will then be encapsulated where it can do the least harm. Further pulling of the outer sheath will remove the entire cover from the probe, which remains in sterile condition. The sheath is then discarded.

Another object of the invention is to provide a probe cover which is resistant to punctures such as those caused by patients' teeth. This is accomplished by utilizing appropriate material in the construction of the sheaths.

Still another object of the invention is to provide a probe cover which is easily removable from a clinical probe without necessarily contaminating the user's hands.

Still another object is to provide a probe cover which will not inhibit the time response of the probe to the temperature which is being taken. This may be done by constructing the inner sheath with an open distal end which terminates before the distal end of the outer sheath.

A further object of the invention is to provide a probe cover which is adaptable for use with mercury and alcohol thermometers, and electronic thermometers in addition.

Other objects and uses of the invention will become apparent from the detailed description which follows.

BRIEF DESCRIPTION OF THE DRAWINGS

FIGS. 5-7 show an alternative construction of the cover wherein the outer sheath is conical;

FIG. 8 is an enlarged view of a means of attachment of the sheaths at their respective tips;

DETAILED DESCRIPTION OF THE PREFERRED EMBODIMENT

Figure 1:
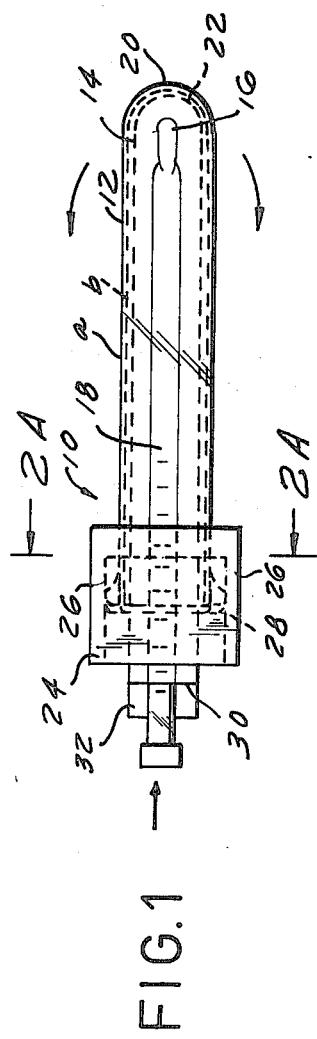
FIG. 1 is a plan view of the probe cover shown before inversion of the outer sheath.

FIGS. 1-4 show the invention in detail both before and after inversion of the outer sheath 12 of the probe cover 10. The outer sheath is shown having an "outer" surface a and an "inner" surface b. The designations outer and inner are, of course, arbitrary due to the ability of the sheath 12 to fold back upon itself. The cover 10 is used as a protective device for a probe 16 which may be a part of a thermometer 18.

The probe cover consists of essentially two parts: an outer sheath 12 of sufficient flexibility to be able to fold back upon itself, and an inner sheath 14 which directly overlies the thermometer and probe. The outer sheath and inner sheath are attached to each other near their respective distal ends 20 and 22. Both sheaths may be manufactured from any suitable material, and they were of polymeric construction in a successful application of the invention.

Figure 3:
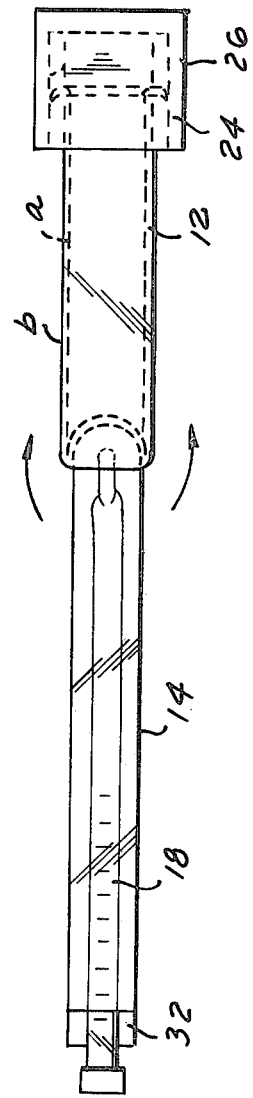
FIG. 3 is a plan view of the probe cover after inversion of the outer sheath.
Figure 4:
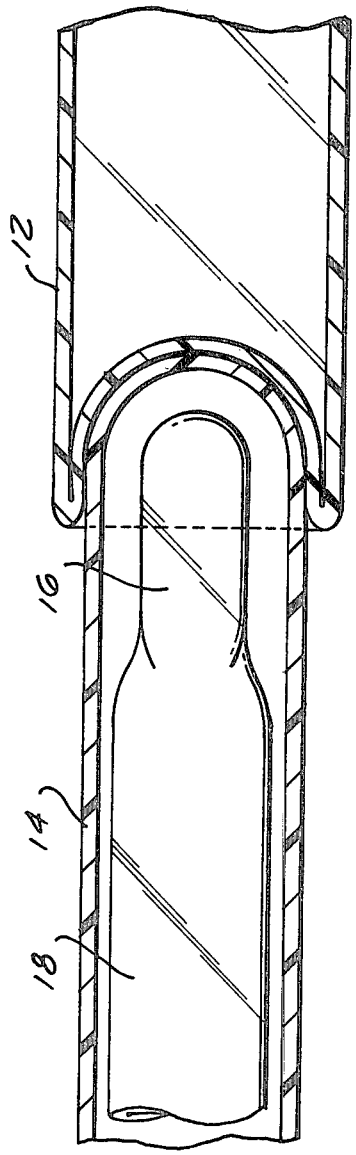
FIG. 4 is an enlarged view of the cover showing the attachment of the outer sheath to the inner sheath.
Figure 2A:
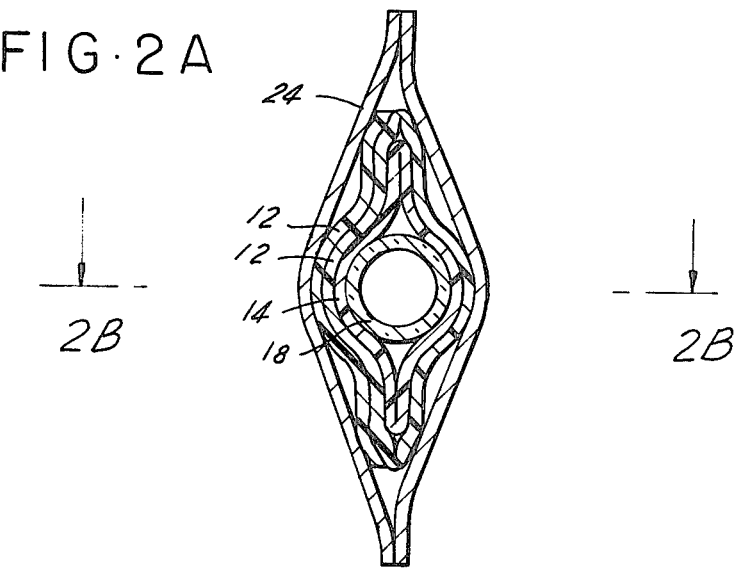
FIG. 2A is a cross sectional view of the cover taken along section 2A—2A of FIG. 1.
Figure 2B:
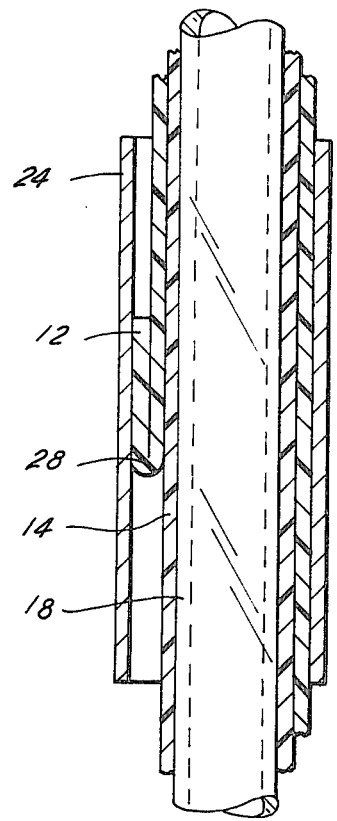
FIG. 2B is a sectional view of the cover taken along line 2B—2B of FIG. 2A.

The outer sheath is attached near its open end to a tab 24 which is made from paper or any other appropriate material. This attachment 26 is made so as to define a fold 28 on one side of the outer sheath 12 before it is inverted. (See FIG. 2B). Conversely, a fold 29 will form on the opposite side after inversion of the sheath (as shown in FIG. 3) as fold 28 disappears.

The inner sheath 14 is not attached to the tab, and its open end 30 extends beyond it as shown in FIG. 1. One half of the inner sheath is cut away near the open end to define a tab 32 to facilitate entrance of the thermometer. To prevent the cover from slipping while the probe is in use, there is sufficient frictional contact between the probe and inner sheath.

FIGS. 5-8 show an alternative construction of the sheaths. Whereas the inner and outer sheaths were approximately parallel to each other in the embodiment shown in FIGS. 1-4, the outer sheath may also be conical. FIGS. 5, 6 and 7 show the sequential steps of providing the cover in a form which is ready for use, inverting the outer sheath after use, and finally removing the entire cover from the probe. These figures also show the attachment of the sheaths at their distal ends. For greater adhesion, the sheaths may be secured to each other along a greater distance. as shown in FIGS. 1-4.

Figure 9:
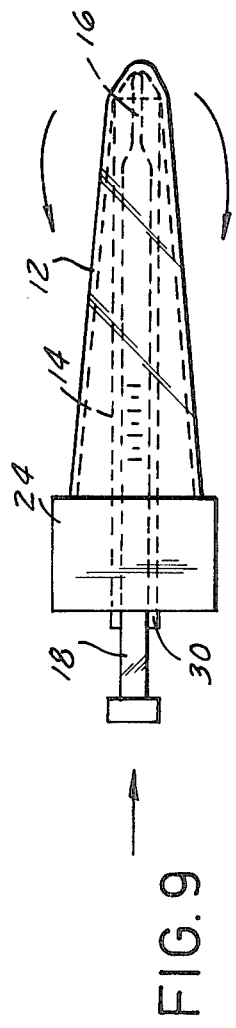
FIGS. 9-11 illustrate another embodiment of the invention wherein the inner sheath is open at its distal end.
Figure 10:
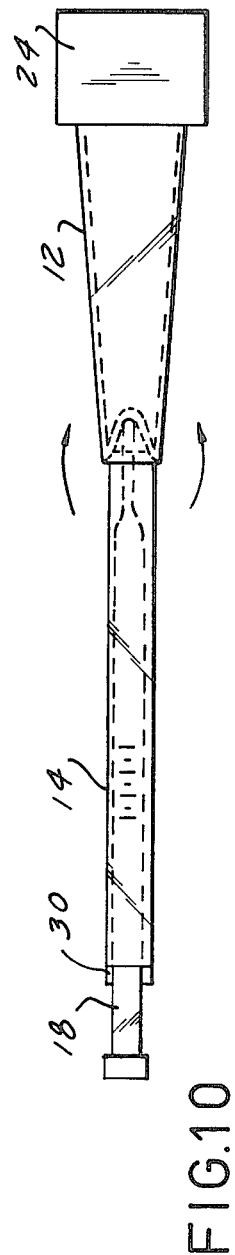
Figure 11:
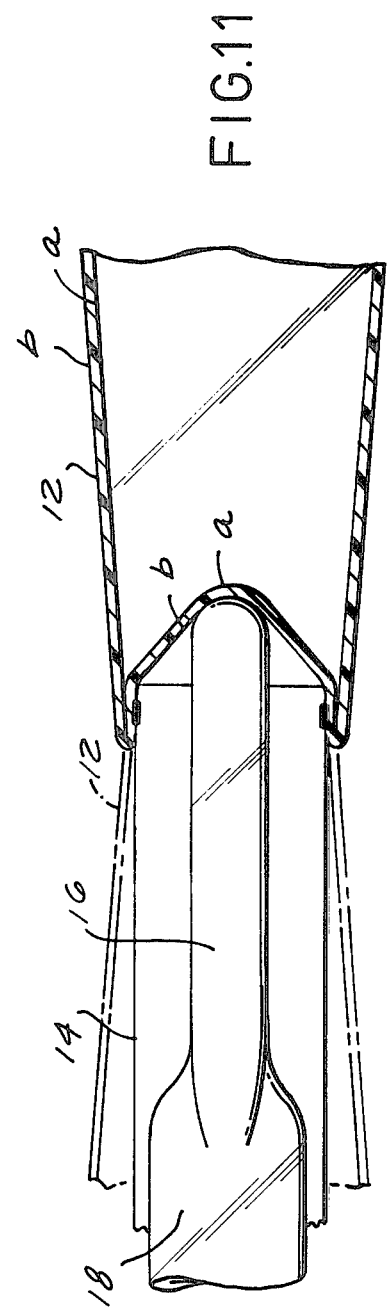

FIGS. 9-11 illustrate another embodiment of the invention wherein the inner sheath is open at its distal end. The sheaths are sealed near their respective distal ends, and the temperature probe may be inserted to the end of the outer sheath. Because the outer sheath is softer than the inner, patient comfort is increased. These is also improved time response to the temperature which is to be sensed, as heat must only be conducted through one sheath.

The operation of the cover shall be described in reference to FIGS. 5, 6 and 7. The cover is stored while the sheaths are in the positions shown in FIG. 5. A detachable paper cover (not shown) protects the outer sheath from contamination before the patient uses it. When this cover is removed, and the thermometer or other probe is inserted within the inner sheath, the device is ready for use.

The thermometer and probe cover are then inserted within a patient's mouth in the form shown in FIG. 5. Once the probe has been so used, it is apparent that the outer surface a of sheath 12 will be contaminated. To minimize the exposure of this surface to the patients, medical personnel, and hospital environment, the outer sheath 12 is of sufficient resiliency to permit its inversion, or folding back upon itself as shown in FIG. 6. After this inversion, it can be observed that the contaminated surface a is on the inside of the device, thereby reducing the chances of spreading bacteria into the surrounding area.

The inversion is accomplished by gripping the paper tab 24 and pulling it in the direction of the probe 16. It may also be desirable to grip the open end of the inner sheath so that it does not slide off the thermometer before the outer sheath is inverted. Removal of the entire cover occurs by continuing to pull the tab after the inversion has been completed. Because the paper portion 24 of the cover is not intended to penetrate the body, the probe cover is removed without the necessity of contacting a contaminated surface. The probe cover may then be discarded, and the thermometer inserted into a new one for use with the next patient.

It may be desirable to construct the inner sheath 14 from a relatively stiff, non-puncturable material when the cover is used in conjunction with an oral thermometer. This will prevent the patient from puncturing the sheath with his teeth and so defeat the entire purpose of providing a covering for the probe. Many plastics and other materials would be suitable in the manufacture of sheath 14. However, sheath 12 must be flexible to function properly.

It can be seen that other designs of the probe cover may be possible without departing from the spirit of the invention. The sheaths, for example, may be manufactured to accommodate probes of alternative sizes and functions. They may also be attached to each other at different locations so long as the outer sheath can invert and encapsulate the contaminated areas of the inner or outer sheath. It is therefore understood that the above description and drawing is illustrative and not limiting.

What is claimed is:

1. A probe cover for protecting a probe from contamination during patient use, comprising:
    an inner sheath having an open end and a close distal end, and being dimensioned to receive and frictionally engage at least a portion of a sensing probe therein; and
    an outer sheath of resilient material having an open end and a closed distal end being attached to the inner sheath at the close distal end of the outer sheath, said outer sheath capable of fitting over at least part of said inner sheath, and also capable of folding back upon itself so as to encapsulate the contaminated surface of the cover which has been exposed to the patient use.

2. A probe cover as described in claim 1 wherein the inner and outer sheaths are attached near their respective distal ends.

3. A probe cover as described in claim 1 wherein the outer sheath is parallel to the inner sheath.

4. A probe cover as described in claim 1 wherein the outer sheath is conical in shape.

5. A probe cover as described in claim 1 wherein the inner sheath is composed of a material to resist puncturing thereof.

6. A probe cover as described in claim 1 wherein the outer sheath has a gripping means attached to its open end.

7. A probe cover as described in claim 6 wherein the gripping means is a paper covering.

8. A probe cover as described in claim 1 wherein the inner sheath extends beyond the outer sheath at its open end before inversion of the outer sheath.

9. A probe cover as described in claim 1 wherein the inner sheath is open at its distal end, and the distal end of the outer sheath extends beyond the distal end of inner sheath and is closed at this end.

10. A probe cover as described in claim 1 wherein the cover is capable of frictionally engaging a thermometer.

11. The combination of a sensing probe and cover including first and second sheaths, comprising:
    a. a medical instrument with a sensing probe designed for insertion into a patient;
    b. a first sheath having a distal end and an open end, and fitting over the sensing end of the probe; and
    c. a second sheath of resilient material having an open end and a distal end, attached near its distal end to the first sheath, and also capable of folding back upon itself so as to encapsulate the contaminated surface of the cover after the probe is removed from the patient.

12. The apparatus according to claim 11 wherein the medical instrument is a thermometer.

13. The apparatus according to claim 11 wherein the first sheath is composed of a material to resist the puncturing thereof.

14. The combination according to claim 11 wherein the second sheath is of a conical configuration.

15. An apparatus as described in claim 11 wherein the second sheath is parallel to the first sheath.

16. The combination according to claim 11 wherein the second sheath contains gripping means at its open end.

17. The combination according to claim 11 wherein the first and second sheaths are attached near their respective distal ends.

18. The combination according to claim 11 wherein the first sheath is open at its distal end, and the distal end of the second sheath extends beyond the distal end of the first sheath and is closed at this end.

19. The combination according to claim 11 wherein the first and second sheaths are both closed at their distal ends.

20. The combination according to claim 11 wherein the first sheath is in frictional engagement with the probe.

21. The combination according to claim 16 wherein the gripping means is a paper tab.

* * * * *